United States Patent
Bubien, Jr.

(10) Patent No.: US 8,112,114 B2
(45) Date of Patent: Feb. 7, 2012

(54) MULTIPLE ACCESS COMMUNICATIONS CELL PHONE (MAC CELL PHONE)

(75) Inventor: Walter J. Bubien, Jr., Saint Johns, AZ (US)

(73) Assignee: Multiple Access Communications LLC, Saint Johns, AZ (US)

( * ) Notice: Subject to any disclaimer, the term of this patent is extended or adjusted under 35 U.S.C. 154(b) by 602 days.

(21) Appl. No.: 12/218,527

(22) Filed: Jul. 15, 2008

(65) Prior Publication Data

US 2010/0016015 A1    Jan. 21, 2010

(51) Int. Cl.
*H04M 1/00*    (2006.01)

(52) U.S. Cl. .................. 455/556.1; 455/575.1

(58) Field of Classification Search ............ 370/329, 370/338, 310, 356; 379/130, 329; 455/556, 455/575, 557, 571
See application file for complete search history.

(56) References Cited

U.S. PATENT DOCUMENTS

| | | | | |
|---|---|---|---|---|
| 5,638,433 A * | 6/1997 | Bubien et al. | ............ | 379/130 |
| 7,110,789 B1 * | 9/2006 | Curtiss et al. | ............ | 455/556.1 |
| 7,634,296 B2 * | 12/2009 | Haeusel | ............ | 455/557 |
| 2007/0036154 A1 * | 2/2007 | Lipman | ............ | 370/356 |
| 2009/0046677 A1 * | 2/2009 | Toledano et al. | ............ | 370/338 |
| 2009/0131131 A1 * | 5/2009 | Wilson | ............ | 455/575.9 |
| 2010/0151917 A1 * | 6/2010 | Wilson | ............ | 455/571 |
| 2010/0214991 A1 * | 8/2010 | Luers | ............ | 370/329 |

* cited by examiner

*Primary Examiner* — Kent Chang
*Assistant Examiner* — Kashif Siddiqui
(74) *Attorney, Agent, or Firm* — Walter Bubien (57) ABSTRACT

The MAC Cell Phone is an automated transparent programmable telecommunication multiple access call and high-speed digital data stream facilitator as a router device for use by a consumer as a facilitator for receiving or sending VoIP telephone calls, fax transmissions, Internet access, digital file sending; receiving; storage, and video streaming which via the means and function of the MAC Cell Phone, stores determined data transmission to facilitate user subscribership interconnected MAC Cell Phone feature and service completion from a plurality of service providers for group discount cost access for the service that is provided through the invention. Additionally, an intricate feature of the MAC Cell Phone is the ability to make all facilitation functions of the MAC Cell Phone securely available to the subscriber of the service for, from, or to all other digital electronic equipment in their home and office that could utilize the functions provided.

17 Claims, 5 Drawing Sheets

MULTIPLE ACCESS COMMUNICATIONS CELL PHONE (MAC CELL PHONE)

RELATED U.S. PATENT DOCUMENTS

| application No. | Filing Date | Pat. No. | Issue Date |
|---|---|---|---|
| 08/439,864 | Nov. 18, 1993 | 5,638,433 | Jun. 10, 1997 |

This application concerns improvements over invention disclosed in U.S. Pat. No. 5,638,433, and in application Ser. No. 08/439,864, allowed Jun. 10, 1993, entitled "Best rate telecommunications access code and data transceiver/facilitator (BRTF)", both being to the same inventor as the present application. The use from the BRTF Patent of the words "Data Transmission Center—DTC" shall have the instant meaning in current terminology for use by the current invention the MAC Cell Phone to include by definition "an Internet Service Provider—ISP", "Internet Dedicated Server—IDS", and the use of the word "Modem" and "Processor" shall have the instant meaning in current terminology for use by the current invention the MAC Cell Phone to be a standard "Broad-Band", "Wireless Local Area Network—WLAN", "Worldwide Interoperability of Microwave Access—WiMAX", Point-to-Point Protocol over Ethernet—PPPoE, and "Voice over Internet Protocol—VoIP", and subsequent future generations derived there from facilitation capable modem and processor, with emphasis added for the digital "Data Transmission", storage and retrieval capabilities accomplished by the use of the MAC Cell Phone.

FIELD OF THE INVENTION

This invention relates generally to multiple access communications of telecommunication Broad-Band, WLAN, WiMAX to Internet network connections and ISP, and IDS access communications of a cell phone device and more particularly to automatic selection of any data communications facilitation to obtain the "best rate" and quality of service available for a user. VoIP call, data transfer, or storage selection is enabled when a user or the user attached digital apparatus creates an off-hook condition or a feature of the service is selected. The off-hook condition can be created by the user of the MAC Cell Phone, or by the user connected digital apparatus for MAC Cell Phone digital router capability utilization in their home and office from a digital apparatus such as a fax, telephone, TV, Video, or computer system when connected to the invention by wireless WLAN, WiMAX or a closed connection to the invention through the MAC Cell Phone base station high speed data jacks. The dialed number, digital query from a user connected digital apparatus, or feature of the invention selected by the user initiates a query of solid state electronic memory banks which contain specific data to facilitate the call, connected apparatus digital communication, or service feature selected. After the invention's choice for use of the appropriate selection of the specific data is complete, the invention's choice for use of data or service feature are automatically connected with the user's desired call destination or service feature selected and then facilitated by the invention.

DESCRIPTION OF THE RELATED ART

The related art, as exemplified in U.S. Pat. Nos. 4,100,377 July 1978 Flanagan; 4,503,288 March 1985 Kessler; 4,585,904 April 1986 Mincone; 4,748,620 May 1988 Adelmann et al.; 4,751,728 June 1988 Treat; 4,782,485 November 1988 Gollub; 4,813,065 March 1989 Segala; 4,862,498 August 1989 Reed; 4,941,172 July 1990 Winebaum, et al.; 5,018,136 May 1991 Gollub; 5,339,356 August 1994 Ishii; 5,400,395 March 1995 Berenato; 5,425,085 June 1995 Weinberger et al.; 5,444,707 August 1995 Cerna et al.; 5,452,289 Sept 1995 Sharma et al.; 5,473,630 December 1995 Penzias et al.; 5,526,353 June 1996 Henley et al.; 5,623,490 April 1997 Richter et al.: 5,966,427 October 1999 Shaffer et al.; 5,995,491 November 1999 Richter et al.; 6,014,437 January 2000 Acker et al.; 6,067,516 May 2000 Levay et al.; 6,084,956 July 2000 Turner et al.; 6,097,804 August 2000 Gilbert et al.; 6,104,706 August 2000 Richter et al.; 6,115,460 September 2000 Crowe et al.; 6,115,468 September 2000 De Nicolo; 6,118,860 September 2000 Hillson et al.; 6,122,364 September 2000 Petrunka et al.; 6,128,379 October 2000 Smyk; 6,137,869 October 2000 Voit et al.; 6,138,072 October 2000 Nagai: 6,167,042 December 2000 Garland et al.; 6,169,741 January 2001 LeMaire et al.; 6,175,565 January 2001 McKinnon et al.; 6,178,239 January 2001 Kishinsky et al.; 6,185,285 February 2001 Relyea et al.; 6,188,762 February 2001 Shooster; 6,195,425 February 2001 Farris; 6,226,286 May 2001 Danne et al.; 6,226,361 May 2001 Koyama; 6,243,443 June 2001 Low et al.; 6,249,576 June 2001 Sassin et al.; 6,266,405 July 2001 Madour et al.; 6,272,126 August 2001 Strauss et al.; 6,282,281 August 2001 Low; 6,282,284 August 2001 Dzonno et al.; 6,292,553 September 2001 Fellingham et al.; 6,298,064 October 2001 Christie; 6,304,572 October 2001 Christie; 6,304,637 October 2001 Mirashrafi et al.; 6,304,653 October 2001 O'Neal et al.; 6,310,941 October 2001 Crutcher et al.; 6,311,182 October 2001 Colbath et al.; 6,320,951 November 2001 Shtivelman et al.; 6,327,572 December 2001 Motron et al.; 6,330,317 December 2001 Garfinkel; 6,337,899 January 2002 Alcendor et al.; 6,343,115 January 2002 Foladare et al.; 6,349,132 February 2002 Wesemann et al.; 6,351,464 February 2002 Galvin et al.; 6,351,526 February 2002 Shaffer et al.; 6,366,577 April 2002 Donovan; 6,366,661 April 2002 Devillier et al.; 6,373,836 April 2002 Deryugin et al.; 6,373,936 April 2002 Raniere et al.; 6,373,938 April 2002 Palacious et al.; 6,385,209 May 2002 Skirmont et al.; 6,389,119 May 2002 McBride; 6,393,476 May 2002 Barnhouse et al.; 6,400,820 June 2002 Edwards et al.; 6,404,746 June 2002 Cave et al.; 6,404,882 June 2002 Fellner et al.; 6,404,884 June 2002 Marwell et al.; 6,408,062 June 2002 Cave; 6,408,065 June 2002 O'Neal et al.; 6,411,697 June 2002 Creamer et al.; 6,411,704 June 2002 Pelletier et al.; 6,415,269 July 2002 Dinwoodie; 6,421,437 July 2002 Slutsman; 6,424,707 July 2002 Chatterjee; 6,430,175 August 2002 Echols et al.; 6,430,176 August 2002 Christie, IV; 6,430,289 August 2002 Liffick; 6,434,143 August 2002 Donovan; 6,442,242 August 2002 McAllister et al.; 6,446,127 September 2002 Schuster et al.; 6,452,932 September 2002 Christie; 6,456,618 September 2002 Kozdon et al.; 6,463,052 October 2002 Christie; 6,466,570 October 2002 Low et al.; 6,470,010 October 2002 Szviatovszki et al.; 6,473,429 October 2002 Christie; 6,480,484 November 2002 Morton; 6,480,581 November 2002 Wu et al.; 6,487,200 November 2002 Fraser; 6,493,337 December 2002 Stevenson, III; 6,493,437 December 2002 Olshansky; 6,496,477 December 2002 Perkins et al.; 6,504,921 January 2003 Kotik et al.; 6,510,219 January 2003 Wellard et al.; 6,519,232 February 2003 Becher; 6,519,333 February 2003 Malik; 6,539,077 March 2003 Ranalli et al.; 6,542,589 April 2003 Baskin; 6,553,023 April 2003 Yamamiya et al.; 6,564,261 May 2003 Gudjonsson et al.; 6,567,398 May 2003 Aravamudan et al.; 6,567,419 May 2003 Yarlagadda; 6,571,212 May 2003 Dent; 6,577,712 June 2003 Larsson et al.; 6,584,094 June 2003

Maroulis et al.; 6,584,098 June 2003 Dutnall; 6,584,186 June 2003 Aravamudan et al.; 6,584,510 June 2003 Anttila; 6,587,836 July 2003 Becar et al.; 6,597,685 July 2003 Miloslaysky et al.; 6,614,786 September 2003 Byers; 6,614,899 September 2003 Sollee et al.; 6,621,899 September 2003 Dezonno et al.; 6,628,760 September 2003 Mirashrafi et al.; 6,633,561 October 2003 Christie; 6,650,890 November 2003 Warn et al.; 6,665,294 December 2003 Christie; 6,665,389 December 2003 Haste, III; 6,665,392 December 2003 Wellner et al.; 6,668,055 December 2003 Marwell et al.; 6,681,252 January 2004 Schuster et al.; 6,690,780 February 2004 Kotik et al.; 6,694,007 February 2004 Lang et al.; 6,697,475 February 2004 MeLampy et al.; 6,707,811 March 2004 Greenberg et al.; 6,707,906 March 2004 Ben-Chanoch; 6,711,160 March 2004 Chan et al.; 6,714,988 March 2004 Takemoto et al.; 6,718,031 April 2004 Fellner et al.; 6,724,755 April 2004 Kim; 6,731,630 May 2004 Schuster et al.; 6,731,642 May 2004 Borella et al.; 6,731,741 May 2004 Fourcand et al.; 6,741,586 May 2004 Schuster et al.; 6,748,057 June 2004 Ranalli et al.; 6,760,429 July 2004 Hung et al.; 6,763,226 July 2004 McZeal, Jr.; 6,765,931 July 2004 Rabenko et al.; 6,769,020 July 2004 Miyazaki et al.; 6,771,637 August 2004 Suzuki et al.; 6,775,368 August 2004 Lee et al.; 6,778,661 August 2004 Yumoto et al.; 6,798,873 September 2004 Vardi et al.; 6,819,752 November 2004 Raniere et al.; 6,822,945 November 2004 Petrovykh; 6,839,359 January 2005 Skirmont et al.; 6,839,421 January 2005 Esparza et al.; 7,142,876 November 2006 Trossen et al.; 7,310,537 December 2007 Wichman et al.: 7,328,046 February 2008 Koskelainen et al.; 7,359,347 April 2008 Acmavaara et al.; 7,386,111 June 2008 Holder; 7,400,253B2 July 2008 Cohen; and Pending U.S. Patent Applications; 2001/0005412 June 2001 Light et al.; 2001/0005415 June 2001 Grunsted et al.; 2001/0014919 August 2001 Tzirin; 2002/0007391 January 2002 Suzuki; 2002/0049815 April 2002 Dattatri; 2002/0049860 April 2002 Koitinen; 2002/0055879 May 2002 Wengrovitz et al.; 2002/0061100 May 2002 DiCamillo et al.; 2002/0095516 July 2002 Nada; 2002/0112073 August 2002 McLampy et al.; 2002/0114430 August 2002 Murata; 2002/0126818 September 2002 Cai et al.; 2002/0129131 September 2002 Yamashita; 2002/0150083 October 2002 Fangman et al. 2002/0191635 December 2002 Chow et al.; 2003/0005280 January 2003 Bobde et al. 2003/0041132 February 2003 Lim et al.; 2003/0043787 March 2003 Emerson, III.; 2003/0053446 March 2003 Kwon; 2003/0063714 April 2003 Stumer et al.; 2003/0086539 May 2003 McCalmont et al.; 2003/0095541 May 2003 Chang et al.; 2003/0095542 May 2003 Chang et al.; 2003/0108064 June 2003 Bilke et al.; 2003/0162526 August 2003 Clarisse et al.; 03/0174695 September 2003 Lautenschlager et al.; 2003/0202504 October 2003 Dhara et al.; 2004/0028025 February 2004 Chang; 2004/0028207 February 2004 Kato; 2004/0039938 February 2004 Katz et al.; 2004/0057415 March 2004 Colson et al.; 2004/0114575 June 2004 Morita et al.; 2004/0190711 September 2004 Miyajima; 2004/0205209 October 2004 Wengrovitz et al.; 2004/0205777 October 2004 Zalenski et al.; 2004/0215770 October 2004 Maher, III et al.; 2004/0223606 November 2004 Enete et al.; 2004/0258021 December 2004 Kashimoto et al.; 2004/0258238 December 2004 Wong; 2004/0258239 December 2004 Gallant et al.; 2005/0018659 January 2005 Gallant et al., provide for telephone number or data routing. These devices do not relate to or involve the variable automatic selection or automatic unique user updating of a wide plurality of independent service provider telecommunication WLAN, WiMAX, VoIP, ISP and or IDS access, and more specifically automatic facilitation selection and sequencing of high speed data access for other digital apparatus in home, the office, as well as at remote locations as a wireless Multiple Access Communications device offering the plurality of routing and service paths to accomplish unique user specific VoIP calls, data transmission, data retrieval, or data storage, video streaming least cost routing as determined by the service offered through the invention, without any intervention, thought for selection, or effort on the part of the caller as a user of the current invention. Additionally, U.S. Pat. No. 7,400,253B2 Cohen Jul. 15, 2008 relates in part to RF and EM harvesting but primarily by design, external source RF harvesting of a specific purpose without shielding the same from the user wherein the MAC Cell Phone primarily absorbs internal source RF and EM field collection for device utilization acting by design as a RF and EM shield for the user. None of the above listed patents are seen to disclose the specific arrangement of concepts disclosed by the present invention the MAC Cell Phone.

SUMMARY OF THE INVENTION

The invention herein disclosed comprises a small Central Processing Unit (CPU) that recognizes a caller's dialed number, or attempt for data communication, or MAC Cell Phone service feature selected and then interrogates a solid-state memory device. The solid-state memory device stores a set of data sequences that enable the caller to automatically complete via WLAN, WiMAX, or Broad-Band their VoIP call, data transmission, data retrieval, or ISP and or IDS data storage. The data sequences are chosen so as to minimize the cost of communications and best available communications routing paths to and with an ISP and or IDS for completion of the VoIP call, data transmission, data retrieval, or remote data storage. This invention determines the appropriate use of sequences of data and completes the call, data transmission, data retrieval, or remote data storage without any added intervention or extra effort on the part of the caller. This invention also provides for the automatic updating of the memory, which stores the data sequencing that facilitates call completion; or data transmission; retrieval; or storage; and service features offered as shown through the LCD display of the device and selected by the user without any added intervention, thought for choice or extra effort on the part of the user. The device of the present invention communicates, through interrogation and interaction, with the Data Transmission Center (DTC). The DTC, of the service provider, previously determines for use the optimum data sequencing for the consumer by researching and analyzing data, capabilities, and cost from a plurality of; VoIP, WLAN, WiMAX, and or Broad-Band telecommunication carriers or any possible high-speed digital path connections to an ISP and or IDS. The DTC is a proprietary communication device which uses standard forms of high speed modem data transmission over; VoIP, Broad-Band, WiMAX, and or WLAN networks, with said VoIP, Broad-Band WLAN, WiMAX, or any high speed future communication generations coming there from, by standard and negotiated service access being provided by the MAC Cell Phone service for use of the invention to accomplish data updating, VoIP call facilitation, and data transmission, data retrieval, data storage, and video or picture stream feed storage or access, MAC Cell Phone LCD feature selections and format; between the MAC Cell Phone and DTC with each user being uniquely identified by the DTC with each user having secure interactive account storage, retrieval, and access features provided by the service that are offered through the MAC Cell Phone.

Accordingly, one of the objects of the present invention is to provide a device that automatically selects optimum sequences of subscriber encoded and path connection data to accomplish multiple access choices of communications.

Another object of the present invention is to provide for automatically combining a choice of data with the caller initiated dialing sequence for completion of the call or digital data communications from any apparatus that could utilize an ISP and or IDS Broad-Band Internet connection, for data transfer or storage without any added intervention, thought for choice or extra effort on the part of the caller.

Another object of the present invention is to provide a device that automatically dials the device's chosen selection (s) of device determined data sequences for an user dialed number final completion, without any added intervention, thought for choice or extra effort on the part of the caller for completion.

It is still another object of the present invention to provide automatic dialing and connection to the DTC during a specific time interval of varying predetermined increments, for automatically updating the internal memory that stores the data sequencing and associated device feature operational choice and LCD display data, without any added intervention, thought for choice or extra effort on the part of the caller.

Another object of the present invention is to allow for automatically determining and directing of an incoming voice or fax/modem call to be facilitated by the device or passed through the device to be received by a telephone, fax/modem, or digital communication apparatus connected to the device.

Another object of the present invention is through a proprietary process to shield the user from electrical frequency generated internally from the MAC Cell phone during normal operations while at the same time absorbing the unproductive electronic fields generated from or around the device for conversion to an electric current where this current can be utilized to provide recycled and captured electrical power to the device while assisting in the charging of the device battery.

Another object of the present invention is to provide a base station, that can be designed as a small and compact portable base station that allows for the connection of any digital apparatus by closed jack connection or in the event said digital apparatus is WLAN or WiMAX capable, access to the facilitation features of the MAC Cell Phone by wireless or by closed connection through the MAC Cell Phone base station.

A still further object of the present invention is to provide a Data Receiver Decoder (DRD modem) that interprets the data retrieved from the DTC or digital communication apparatus connected to the device so that it may be interpreted and input into and from the memory unit and central processor of the present invention.

With these and other objects in view which will more readily appear as the nature of the invention is better understood, the invention consists in the novel combination and assembly of parts hereinafter more fully described, illustrated and claimed with reference being made to the attached drawings.

DESCRIPTION OF THE PREFERRED EMBODIMENT

Referring to FIGS. 1, 2, 3 and 4 a standard Cell Phone is integrally incorporated with function and operational abilities of the Best Rate Telecommunications Access Code and Data Transceiver/Facilitator (BRTF) being integrated with the MAC Cell Phone 30 as used with the MAC Cell Phone Base Station 55 whereby a, fax, computer modem or any other digital device 19 is shown connected to via the appropriate connection of a standard RJ-11 modular phone or fax/modem modular phone jack 90 or T Ethernet (RJ-45) jack 150, USB jack 250, second USB jack 250A, cable F-connector 350 high-speed data port jacks utilizing the complete functional abilities of the MAC Cell Phone 30 to receive and transmit digital data through Broad-Band 50 or 500, WLAN 50, or WiMAX 50 communications receivers for access to internet networks 22 and subsequent ISP and IDS 220; 53; and VoIP Network 44.

An externally programmable, telecommunications ISP 220 and or IDS 220 access, in conjunction with specific data transmission, data determining the dialing memory of device 30 for access to VoIP 44, Broad-Band 50, Internet Network 22, and date storage retrieval station 53 from variable path connections as determined by the MAC Cell Phone CPU 1, to and from a consumer's telephone dialing device 30; 54, or 19 via outside data input from ISP/IDS 220, stores telecommunication access codes, and data that have been predetermined to offer subscribers the "best rate" or least cost of service as a subscribership group. When a call is initiated, the device uses the consumer's dialed number or MAC Cell Phone feature selected through user MAC Cell Phone 30 keypad 24 and or 23 actuation, as will be displayed on LCD display 28 transmitted from the consumer's telephone dialing device to retrieve as determined by the (MAC Cell Phone) 30 choice for use of telecommunication ISP and or IDS access codes, digital sequences and data transmission from memory storage with said MAC Cell Phone 30 device selected unique choice of ISP and or IDS access codes, digital data sequence of determined data being digitally transformed with the consumer dialed number entered on a standard cell phone keypad 24 or MAC Cell Phone 30 feature selected through user actuation on keypad 23. The inventions choice of available ISP and or IDS Telecommunications Access Codes—TAC, and data transmission paths being selected for use by all uniquely identifiable MAC Cell Phone users as subscribers of the service from area to area allows for billing accountability which offers substantial volume discounts to be accomplished and realized through said grouped operation, and thus is chosen so as to provide the "best rate", least cost and best quality of service for the consumer. The memory contains time of day information to aid in "best rate" and least cost selection. The choice for use of ISP and or IDS, digital Telecommunication Access Codes (TAC), digital sequence of determined data embedded digitally with the dialed telephone number and or service feature utilized by the subscriber to the service being selected are then transmitted through the Broad-Band 40 and or 500, WLAN; WiMAX 40 for connection to receiver 50 that is identified and selected by the invention or if no receiver 50 is available then through Broad-Band 500. The consumer's voice or data communication call is automatically connected to the called destination, via the subsequently device monitored and facilitated connection to IAN 22; ISP/IDS 220; VSN 44; and or DSRS 53 via the telecommunications company or available paths chosen and as determined by the "best rate" and least cost memory. The 'best rate: and least cost selection and call connection processes are automatic, transparent and outside the ability for choice to and by the consumer'.

In stand-by mode, the off-hook detector 16 continuously monitors the CPU 1; incoming data jacks 90; 150; 250; 250A; 350; and WLAN, WiMAX TRANSCEIVERS 40 and 41, to determine if a call or digital data communication attempt is being made. In the case in which a call or digital data communication attempt is initiated by the telephone, fax, or modem connected to 55 or initiated by the user through keypad 24 and then sent by the user through actuation of keypad 23, in the event of a phone call the central processing unit (CPU) 1, activates the Line Interrupter Switch (LIS) 12 to direct the dialing tones or digital data communication attempt through the buffer 11 to the DTMF decoder 4. The dial tone and digital communication generator 17 provides the dial or data tones, normally produced by the phone line 200 or MAC Cell Phone speaker 35, to the caller on line 200 or through speaker 35, or digital apparatus connected to jacks 150, 250, 250A, 350. The DTMF decoder 4 deciphers the DTMF dialing tones or a digital communication into a specific data sequence represented by those tones or digital data communication attempt and relays this information to the CPU 1. As an example, consider the initiation of a long distance call which utilizes an international destination number beginning with zero; one; one (011), then a three (3) digit area code and a seven (7) digit individual number, followed by sequence which may differ slightly from that described herein. If the numbers (011) and following numbers in the dialing sequence are detected, the numbers are deciphered and stored in memory. The first numbers are noted as the area and city code or international country and city code, of the number being dialed. The CPU 1, then queries the clock module 6 for the current local time and date. Using the area code and time information, the CPU 1 generates a search code which it uses to search random access memory (RAM) 2 for a matching, choice for use of ISP and or IDS access codes, digital sequences or other determined data for accomplishment of the completion of the consumer dialed call, or MAC Cell Phone feature selected at the best rate available for the completion of the call, data transmission, data retrieval, or ISP and or IDS data storage. It is noted here that since RAM chips are modular, space is left to accommodate expansion 3 of the memory. This would be desirable should it be necessary to store additional data. Upon finding a match to the ISP and or IDS search code, the associated chosen TAC, digital sequence and determined data are retrieved. The CPU 1 then takes the choice of TAC, digital sequences and determined data and appends it with the digits of the dialed number or MAC Cell Phone feature selected. This number or feature selected is then sent to the DTMF generator 5 where an entire sequence of DTMF or specific digital sequences are generated for transmittal through buffer 10 to LIS 13 and if required, data tones are generated by the DRD modem 7 when signaled by CPU 1 for transmittal through buffer 9 to LIS 13.

Figure 1:
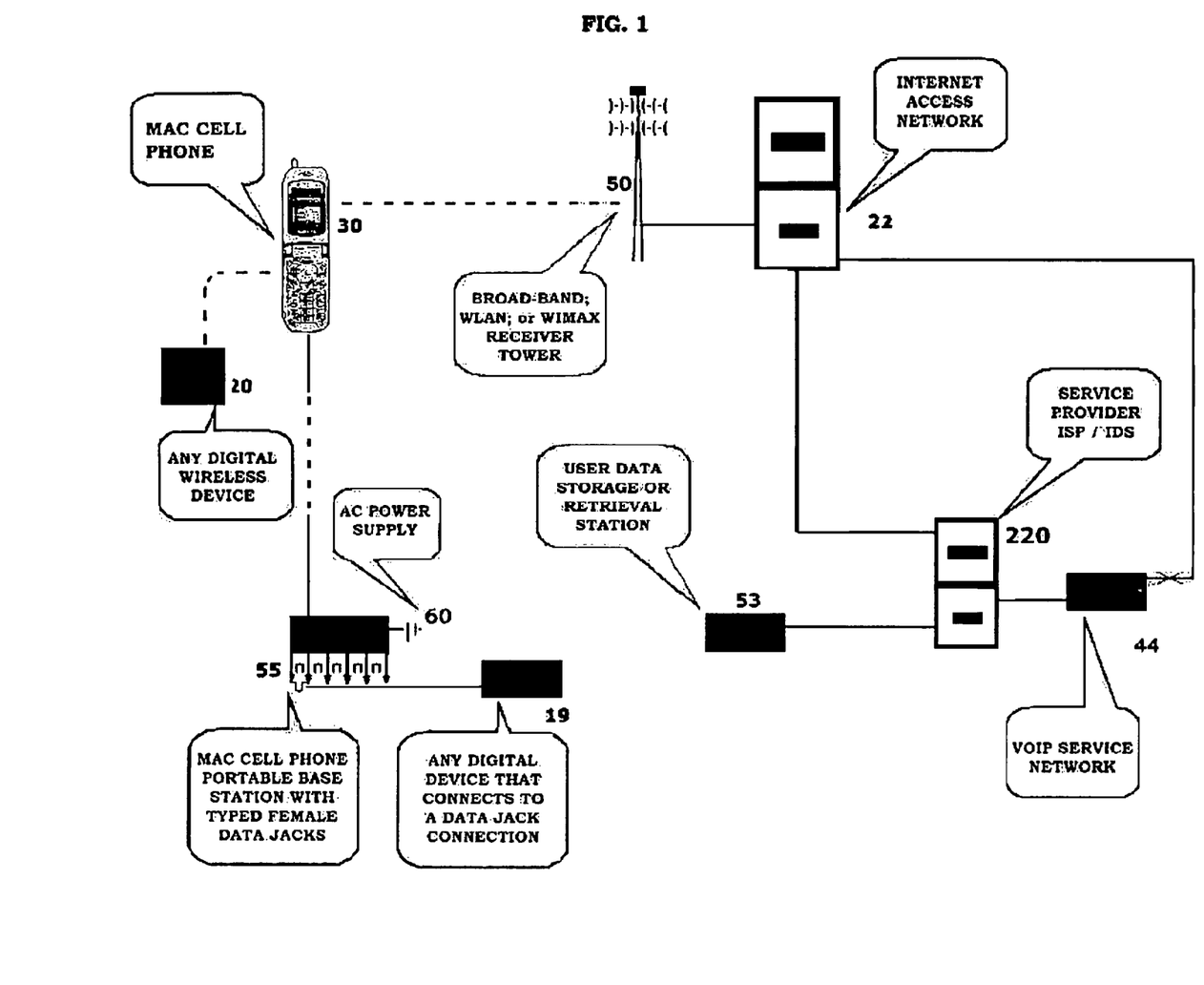
FIG. 1 is the block diagram of the major communication capability components of the invention showing their interrelationship and function.
Figure 2:
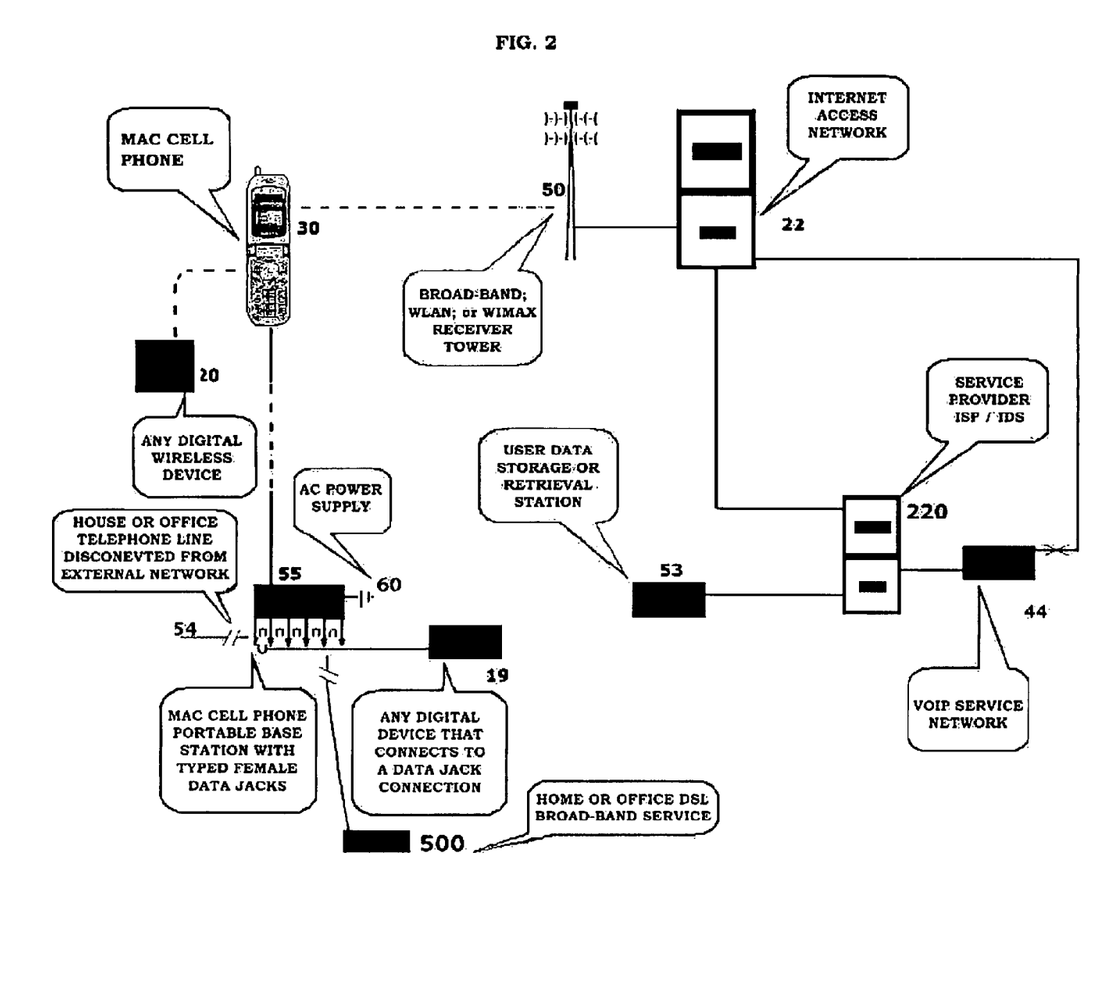
FIG. 2 is the block diagram of the major communication capability components of the invention for in-home and office use showing their interrelationship and function.
Figure 3:
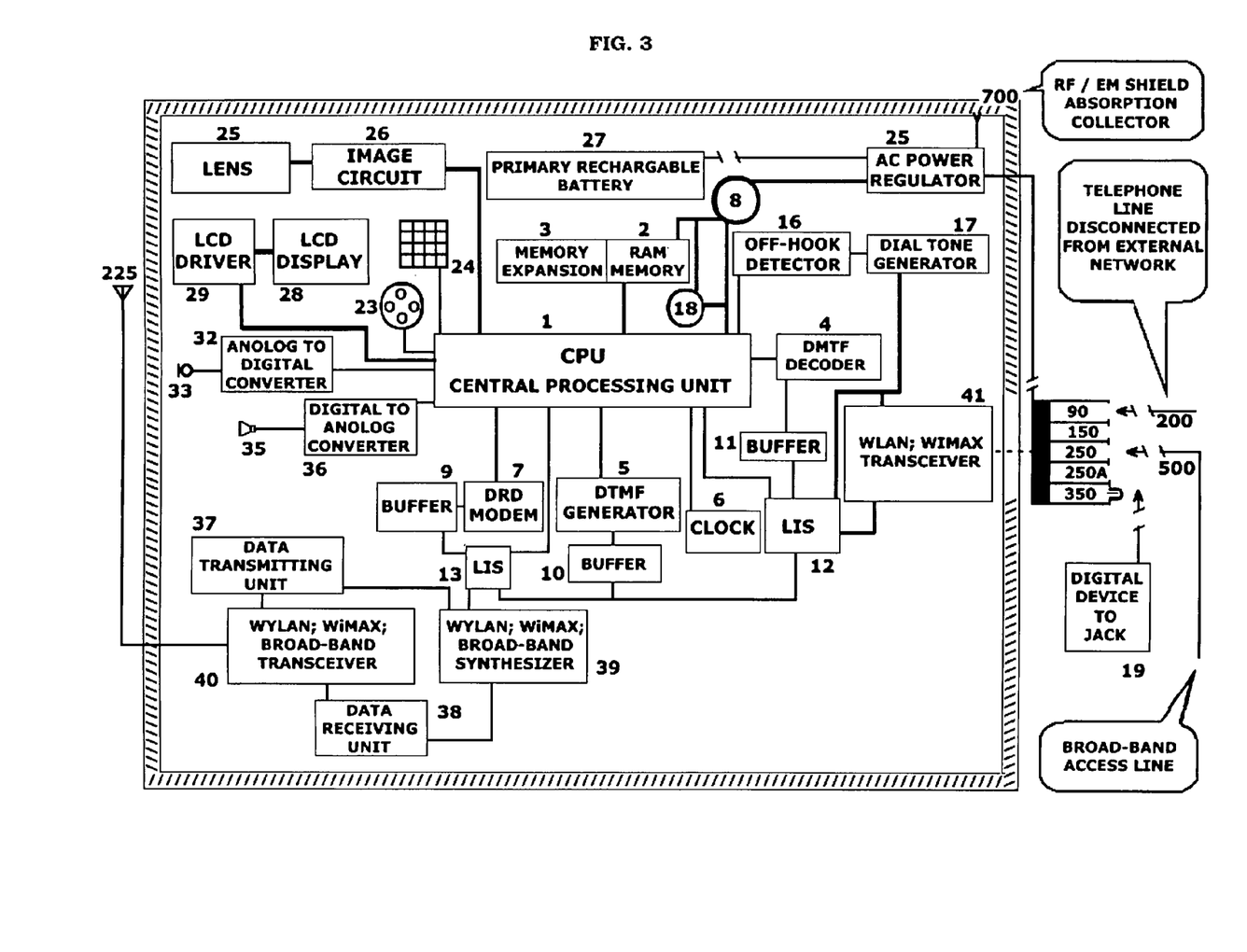
FIG. 3 is the block diagram that illustrates the incorporation of a standard cell phone-dialing device having multiple access wireless communications capabilities with the utility patent of the BRTF U.S. Pat. No. 5,638,433 forming the instant invention showing their interrelationship and function.
Figure 4:
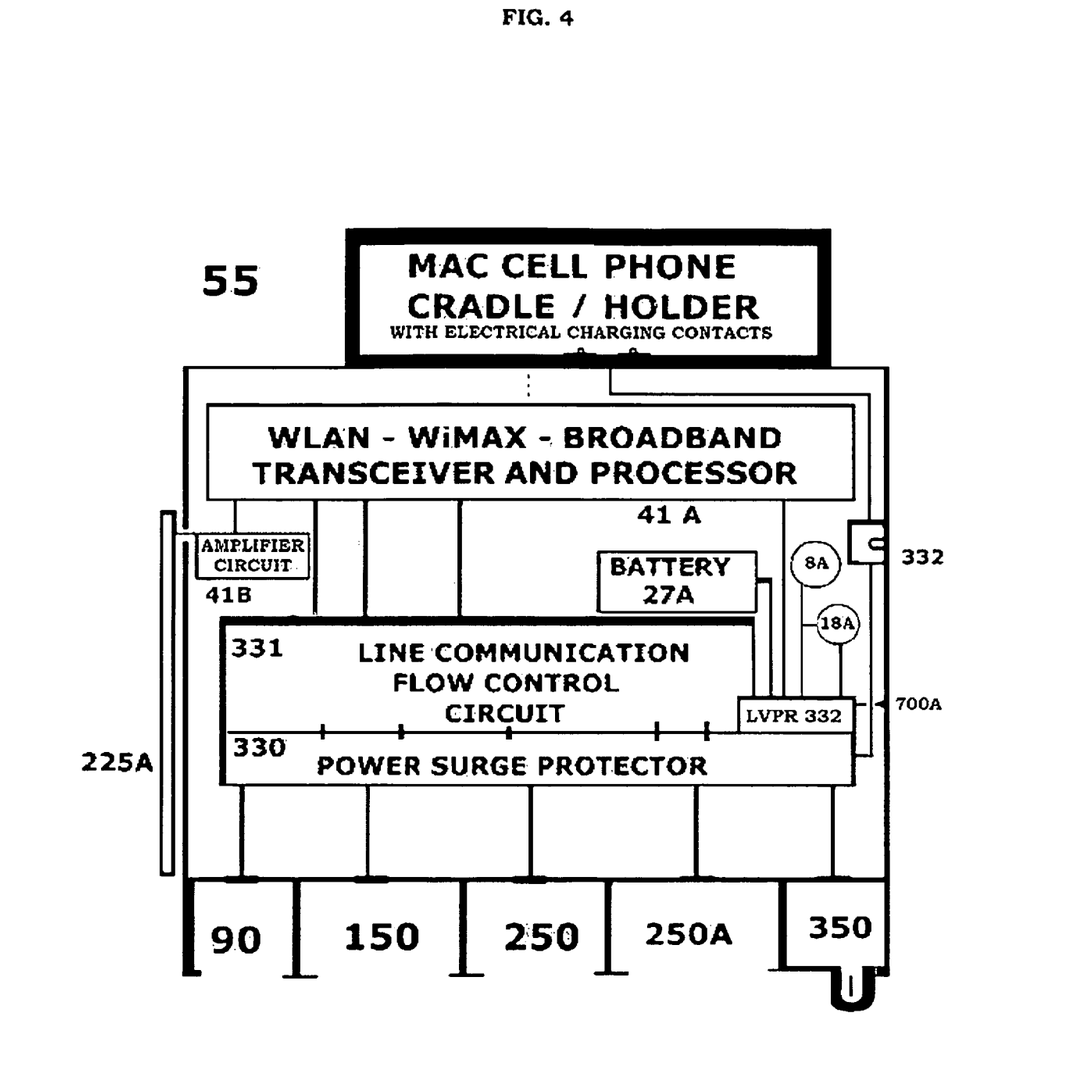
FIG. 4 is the block diagram that illustrates the major components of the MAC Cell Phone home or office Base Station being portable and power self-sustaining showing their interrelationship and function.
Figure 5:
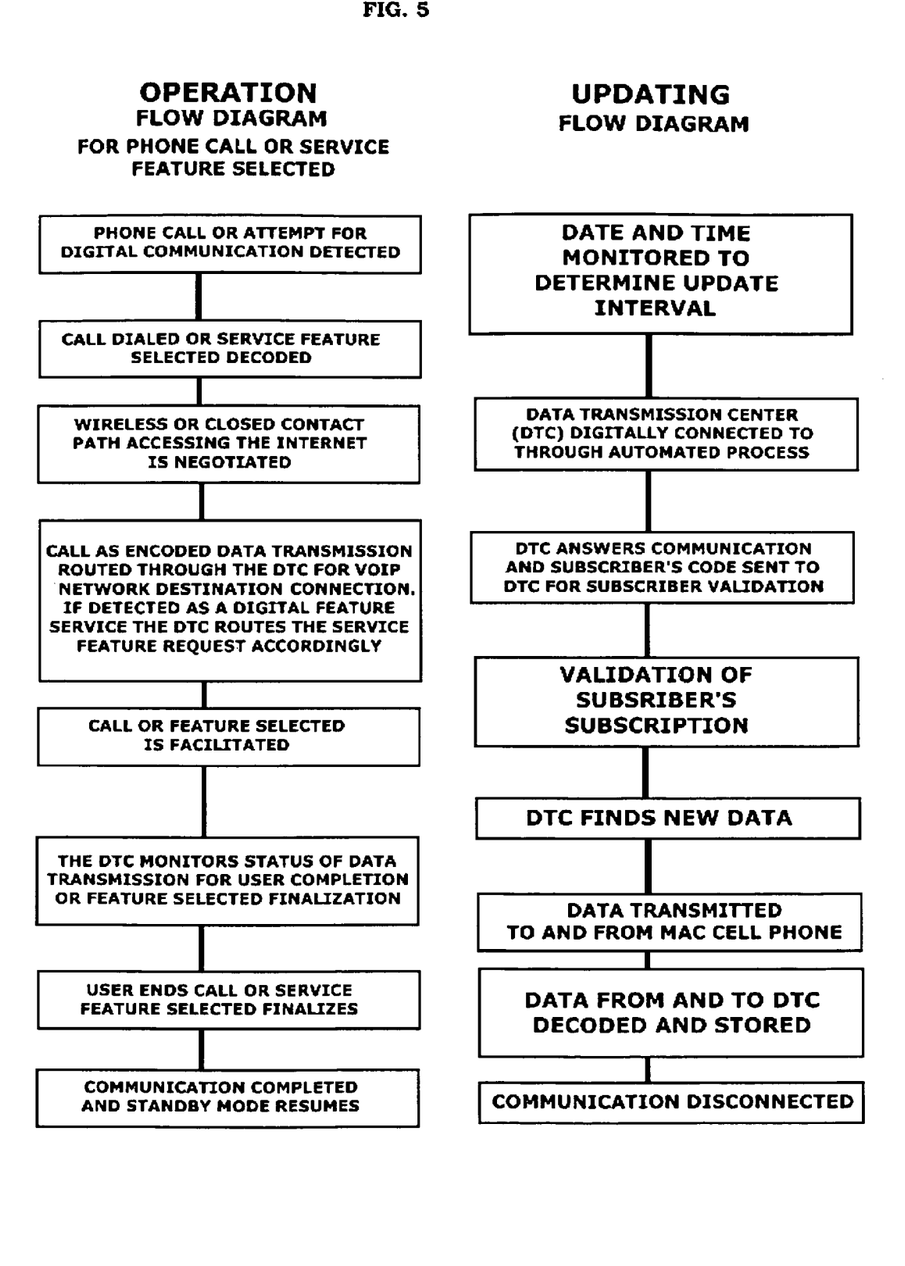
FIG. 5 is the flow diagram that illustrates the unique facilitation of automated voice and data communications of the MAC Cell Phone and the updating accomplished between the MAC Cell Phone and the DTC.

The CPU 1 causes the LIS 13 to direct the tone sequence through the output Broad-Band, WiMAX, or WLAN synthesizer circuit 39 which connects through the data transmitting unit 37 to transceiver 40 over antenna 225 where the MAC Cell Phone seeks a predetermined and available receiver 50 for IAN 22 digital communications to the external ISP and or IDS 220. When the specific digital sequences are sent to the IAN 22, for path connection to DTC 220 as required for completion, the LIS 12 is switched to complete the connection of the MAC CELL phone call, or phone call attempt through jack 90; or digital communication attempt by apparatus 19 to the external ISP and or IDS 220. In the event that no tower 50 wireless connection is detected, CPU1 through its normal digital communications seek efforts will look for a closed Broad-Band connection 500 from the high speed data ports on Base Station 55 through to an IAN 22. When the device's choice for use of TAC, digital sequences and determined data is detected by the local IAN 22; ISP and or IDS telecommunications carrier, the call is routed to the carrier or path connection chosen by the MAC Cell Phone to service provider DTC 220 for data storage or retrieval from station 53 or VoIP call facilitation through 44. In standby mode when the device detects an incoming user specific VoIP call or data communication from external Broad-Band connection 50 through 225; 40; 38; 39; LIS 13 through buffer 9 and DRD modem 7 allows CPU 1 to determine the incoming call as being a phone call or a data communication call, or in the event of a detected call or digital communication attempt passing in through base station 55, from line 200 or apparatus 19, then CPU 1 directs or switches the incoming VoIP call through LIS 12 to be received by the user of MAC Cell Phone 30 through CPU1 controlled components 36; 35; 32; and 33 and or through line 200 when connected to the MAC Base station 55 through jack 90, or in the event of an identified digital communication by and through digital apparatus device 19 connected on high-speed data port jacks T Ethernet (RJ-45) 150, USB 250, USB 250A, or cable F-connector 350, or wireless communication from a digital device 20, CPU1 through its related buffer and switching components, will Identify what MAC Cell Phone 30 feature is being attempted and then facilitate that digital communication based on the service provider DTC facilitation programming of CPU 1. In addition to the above mode of operation, the MAC Cell Phone also operates in a second mode. Referring to FIG. 4 this second mode provides for the automatic updating of the facilitation abilities of the MAC Cell Phone in obtaining MAC Cell Phone 30 features as offered and displayed on LCD 28 for user selection, ISP and or IDS TACs, digital sequences, related data, in conjunction with modem data transmission instructions and attendant search codes, as well as, the next Updating Time Interval (UTI) for the individually encoded MAC Cell Phone used by the subscriber. The UTI is the time period during which the service provider Data Transmission Center 220 (DTC) comprised of a Broad-Band transceiver modem and a computer operation terminal connected to an IAN 2. Said DTC composite operation with IAN 22, VoIP service network 44, and UDSRS 53 herein after shall be referred to in composite form as being conditionally access controlled by the DTC 220 that has allocated time to accept incoming VoIP calls and or date transmission, date retrieval and or data storage from specific MAC Cell Phone users as a group to allow for updating the unit and data facilitation of MAC Cell Phone features available to and selected by the user. In this mode, the CPU 1 continuously monitors the clock 6 until the beginning of the UTI has arrived. At the moment, or as soon as the MAC Cell Phone is idle (no incoming or outgoing data transmissions are in progress as detected by the MAC Cell Phone), the CPU 1 initiates the automatic updating sequence. The CPU 1 opens LIS 13 and then retrieves from the random access memory 2, choices for use of TAG, digital sequences and determined data to accomplish secure connection with the DTC 220. The CPU 1 then transmits that data sequence through the DRD modem 7 when signaled by CPU 1 for transmittal through buffer 9, to LIS 13, and 39 the detected and available device chosen Broad-Band, WLAN, or WiMAX connection 50 and or through LIS 12; transceiver 41; base station 55; to Broad-Band 500 if detected by CPU1 as available. When the call is completed to the DTC 220, the DTC 220 will verify the subscriber's subscription, look up the new TACs, digital sequences and feature data determined to be appropriate and advantageous to the specific subscriber and transmit a data signal back to the MAC Cell Phone. The CPU 1 instructs the LIS 13 to direct the signal through buffer 9 to the Data Receiver Decoder DRD Modem 7. The DRD Modem 7 decodes and interprets the incoming or outgoing data stream into a form that the CPU 1 can then store and transmit in or from the RAM 2. Once the modem data has been stored and transmitted to and from RAM 2, the CPU 1 sends a signal back to the DTC 220 acknowledging that successful and verified updating and transmitting of data to and from the MAC Cell Phone has been completed. The CPU 1 then terminates the call, closes LIS 12 and or LIS 13, and sets the MAC Cell Phone into stand-by mode.

In the event the MAC Cell Phone cannot detect through WLAN, WiMAX, BROAD-BAND TRANSCEIVER 40 an adequate wireless communications 50 access, CPU 1 will attempt a digital communication with a closed connection of an available broadband access through a digital connection to one of the high speed communication jacks on base station 55. If detected by CPU 1, CPU 1 will facilitate all services and features provided through the MAC Cell Phone 30 through base station 55 of VoIP Call Routing, data communication transmission, data storage and retrieval, available through the MAC Cell Phone as a Multiple Access Communications device, utilizing the closed broadband connection 500 detected by the MAC Cell Phone 30.

It should be noted that the MAC Cell Phone also contains a Radio Frequency-RF/Electrical Magnetic-EF shield absorption collector 700 connected to AC Power Regulator 25 protecting the user from internal RF and EM fields while also recycling electrical power absorbed for conversion by AC Power Regulator 25 in the MAC Cell Phone 30 and 700A through LVPR 332 in the base station and then direction for use by Primary Rechargeable battery 27 or battery 8 and in the base station battery 8A and 27A such as a standard rechargeable nickel cadmium cell battery. The battery 8 and 8A provides for retention of memory in case of a power outage and a capacitor 18 for 30 and 18A for the base station also provides for a brief (3-15 minutes) retention of memory in the event that the MAC Cell Phone is disconnected from an electrical line power supply or during replacement of the battery 8 or 8A and or the MAC Cell Phone primary rechargeable battery 27 or base station rechargeable battery 27A. The buffers 9, 10 and 11 provide isolation of the lower voltage CPU 1 and other associated circuitry from power spikes that could occur effecting the Mac Cell Phone 30 and the MAC Cell Phone Base Station 55 is equipped with a electrical spike circuit 330 protecting the Base Station 55 line flow communication flow control circuit 331; WLAN; WiMAX; BROAD-BAND Transceiver and Processor; Low Voltage Power Regulator—LVPR 332; and its associated circuitry from power spikes coming from the electronic apparatus connected to modular jack or fax/modem jack 90, and the T Ethernet (RJ-45) 150, USB 250, USB 250A, cable F-connector 350 high-speed data port jacks, and electrical power supplied from AC Power supply 60 connected to base station AC jack 335 as regulated through connection to the Low Voltage Power Regulator—LVPR 332;

It should also be noted that base station 55 being equipped with a WLAN; WiMAX; BROADBAND Transceiver and processor can through the amplifier circuit 41B and antenna 225A facilitate digital wireless communication with any wireless device 20 giving secure access to and facilitating the automated feature operational abilities of the MAC Cell Phone 30 if chosen by the user of the device.

Having shown and described one embodiment of the invention, those skilled in the art will realize that variations and modifications can be made to produce the described invention and still be within the spirit and scope of the claimed invention. It is to be understood that the present invention is not limited to the sole embodiment described above, but encompasses any and all embodiments within the scope of the claims presented.

I claim:

1. A Multiple Access Communications (MAC) cell phone for facilitating communication access to a broad-band, VoIP, WLAN, or WiMAX access network comprising:

a first electronic memory for storing a user dialed phone call number or MAC cell phone data transfer feature selection, each said selected feature or dialed number being operationally related to a pre-selected routing criteria which is linked or through a specific geographically sensitive Internet service provider (ISP) and or Internet dedicated server (IDS) for communication and facilitating the feature selection of the MAC cell phone;

means for searching said first electronic memory to obtain routing of said dialed phone call number or data transfer feature selection in conjunction with a determined data transmission to facilitate user subscribership interconnected grouped discount least cost routing call or data transmission completion in accordance with said pre-selected routing criteria;

means for transparently connecting the dialed phone number or data transfer feature selection according to said routing;

wherein said data transmission is at least one of: VoIP, broad-band, WLAN, and WiMAX transfer and whereby the MAC Cell Phone can be modified to adapt to variations thereof, the data transmission then further being routed over the Internet to a subscriber identified ISP and/or IDS storage or transmission site;

wherein the means for transparently connecting include means for automatically dialing said dialed phone number or data transfer feature selected in a determined secure data transmission to facilitate user subscribership interconnected grouped discount least cost routing call completion wherein a cost advantage to the user is obtained by routing of a VoIP call or ISP and or IDS secure communication for data storage or retrieval;

means for accessing a communications access means of an ISP and IDS being a data transmission center (DTC), said DTC storing, or transmitting sequences of data within a second electronic memory, to connect said MAC cell phone to said DTC for transferring or receiving said VoIP call; or a digital video stream; or data to said second memory, and from said second memory, and communications access means connects said MAC cell phone for transferring data between the DTC based on the MAC cell phone's CPU operational programming as determined by the DTC for the capturing of data obtained from the MAC cell phone during operation of a call or data storage or data transfer or service feature selected by the subscriber;

wherein said MAC cell phone is incorporated integrally by placement on or in a MAC Cell Phone base station having its own electrical power access to the home or office power grid, wherein the MAC cell phone base station charges the battery of the MAC cell phone by closed electric connection, has its own WLAN and WiMAX communication amplifier circuit to increase the WLAN and or WiMAX range of the MAC cell phone, and is equipped with a female T Ethernet (RJ-45), USB, cable F-connector high-speed data ports and female phone connector (RJ-11) for use by a home or office equipment that requires a closed hard connection;

and means for a MAC Cell Phone base station that is compact, portable, and have electrical power self sustaining abilities with self sustaining electrical power through such as a rechargeable nickel cadmium battery incorporated therein and if an external electrical power source is available, an electrical female AC jack, so that a digital device apparatus such as a digital video camera or other digital apparatus equipment can then be connected to a female T Ethernet (RJ-45), USB, cable F-connector high-speed data ports and female phone connector (RJ-11) to utilize the service and functionality offered by the MAC Cell Phone base station.

2. The MAC cell phone as claimed in claim 1, further comprising a clock which stores the date and time of day to provide a clock output signal and wherein said means for searching is further responsive to said clock output signal, whereby the pre-selected routing criteria of connection to said DTC is obtained by referencing said clock and said first electronic memory and an accurate record of callers long distance call and transmitted data storage or retrieval durations are stored in said first electronic memory and the DTC utilized for use and billing purposes verification.

3. The MAC cell phone as claimed in claim 1, wherein said MAC cell phone is incorporated integrally, whereby any external standard WLAN or WiMAX or Wireless capable connection between a telephone, facsimile machine, computer system, or video recording or display device within range of the invention can securely access through WLAN or WiMAX or a Wireless communication the complete facilitation abilities and service features of the invention by secure digital key entry allowing WLAN or WiMAX or Wireless communication for access to the MAC cell phone when initiated by the user of the MAC Cell Phone.

4. The MAC cell phone as claimed in claim 1, further comprising a clock which stores the geographically sensitive date and time of day of all operations of the MAC cell phone, and means responsive to said stored date and time to access said DTC, wherein communication to and from said data transmission center is activated according to said clock.

5. The MAC cell phone as claimed in claim 4, further comprising making available all functionality of the MAC cell phone by connection to the MAC Cell Phone base station for automatically selecting a telecommunications routing in accordance with a pre-selected routing criteria from a plurality of geographically available Broad-Band, WLAN, and WiMAX receiver stations for Internet routing to an ISP and or IDS between a calling station in the home, office, or a remote location and an ISP and or IDS destination station;

means for a calling station memory for storing a plurality of routing codes in conjunction with determined data transmission to facilitate user subscribership interconnected grouped discount least cost routing call completion, each routing code indicative of a different Broad-Band, WLAN, and WiMAX receiver transfer to Internet network routing as predetermined by the device to ISP or IDS telecommunications routing;

means being responsive to a number dialed at said calling station for providing a search signal, upon detection of a dialed number or MAC Cell Phone feature offered by the invention requiring a final termination;

means being responsive to said search signal for searching said memory according to said dialed number to select one of said data routing codes in conjunction with determined data transmission to facilitate user subscribership interconnected grouped discount least cost routing call completion geographically sensitive of detected and available digital communication for a Broad-Band, WLAN, and or WiMAX receiver connection for Internet routing selected through the device of a standard digital VoIP telecommunications routing and or ISP and or IDS data storage and or retrieval facility for satisfying said pre-selected routing criteria;

means for arranging said selected digital routing codes in conjunction with determined data transmission to facilitate user call completion with said dialed number to provide a digital encrypted signal capable of providing dialed information digitally embedded with determined data transmission to facilitate user subscribership interconnected grouped discount least cost routing call completion to enable said calling station to be connected to said destination station via a selected telecommunications Broad-Band, WLAN, and WiMAX transfer receiver for Internet routing ISP and or IDS routing call or data demand completion;

means for a clock providing an output signal geographically sensitive of the date and time;

means for inputting said output signal with said search signal to enable searching said memory according to both said clock output signal and said dialed number or data transmission for storage and maintaining said clock signal and dialed number or storage call duration in said memory of the MAC cell phone;

means for a calling station dialer responsive to said clock output signal to access a data transmission center (DTC), which enables a calling station to connect to said DTC, at a selected time and date to enable the connection of said DTC to said calling station, said DTC including processing means for storing geographically sensitive digital access routing codes indicative of carrier controlled links;

and means for said calling station memory to enable said DTC to transmit and receive data to be stored in and transferred from said memory during said connection.

6. The MAC cell phone as claimed in claim 5 further including automatic dialing means responsive to said composite number signal digitally transformed to facilitate routing VoIP call completion through ISP, IDS routing to facilitate user call completion for said dialed number, through data transfer, retrieval, data communication, or data storage.

7. The MAC cell phone as claimed in claim 5, further comprising off hook detection means associated with a calling line or digital apparatus of said calling station which operates to provide an output signal when said calling line goes off hook, and means to respond to said off hook output signal to monitor dialing on said calling line or attempt of an external apparatus for digital communication to provide said search signal upon detection of a dialed destination and to transmit said dialing by VoIP call or attempt for digital Internet communication by Broad-Band through the device when an off hook and then dialed destination station or attempt for digital communication is detected.

8. The MAC cell phone having the selection apparatus according to claim 7, further comprising a line interrupter switch coupled between a calling station input and a calling station output to enable dialing or attempt for digital communication to be transmitted to said calling station output when a dialed destination station or attempt for digital communication is detected and to switch said dialing or attempt for digital communication from said output when said dialed destination or attempt for digital communication is detected.

9. The MAC cell phone system according to claim 7, further including automatic dialing means providing a dialing and data modem sequence output according to the user dialed number to cause the VoIP connection between said calling station or attempt for ISP and or IDS digital communication that requires specific and variable data sequencing for connection.

10. A MAC cell phone for automatically dialing a selected grouping of numbers digitally encoded into determined data transmission to facilitate VoIP call completion, or for user selected MAC Cell Phone feature digital communication that will facilitate ISP and or IDS data storage or retrieval predicated by a caller's use of the MAC Cell Phone Feature selected, said caller's dialed number being input from the telephone dialing device and or home or office digital equipment that could make use of a Broad-Band connection, to accomplish completion of caller's selected destination or attempt for any digital communication, comprising:
   means for an electronic memory for receiving and storing said selected grouping of numbers transformed with determined data transmission to facilitate user call or attempt for digital communication completion;
   means for interrogating said electronic memory to obtain the device's choice of said selected grouping of numbers transformed with determined data transmission to facilitate user call or attempt for specific Internet digital ISP and or IDS communication completion;
   means for automatically dialing the device's choice of said selected grouping of numbers digitally transformed with determined data transmission to facilitate encrypted and secure user call completion of said caller's dialed number, or device feature selection for specific digital ISP and or IDS communication for remote data retrieval or storage wherein a grouped subscriber cost advantage is obtained for the caller's selected destination and where a paid subscribership is offered by and through the MAC Cell Phone service in a manner that is transparent to the caller so that no intervention, thought for choice or extra effort on the part of the MAC Cell Phone user is required to reach their desired destination;
   means for a first clock which stores the date and time of day and day of month, such that a grouped subscriber cost advantage is obtained for connection to said caller's selected destination or ISP and or IDS digital communication by referencing said first clock and said electronic memory, and whereby call activity and data transmission or storage duration is maintained in said memory for downloading;
   wherein said MAC cell phone is incorporated integrally by placement on or in a MAC Cell Phone base station having its own electrical power access to the home or office power grid, wherein the MAC cell phone base station charges the battery of the MAC cell phone by closed electric connection, has its own WLAN and WiMAX communication amplifier circuit to increase the WLAN and or WiMAX range of the MAC cell phone, and is equipped with a female T Ethernet (RJ-45), USB, cable F-connector high-speed data ports and female phone connector (RJ-11) for use by a home or office equipment that requires a closed hard connection; and means for a MAC Cell Phone base station that is compact, portable, and have electrical power self sustaining abilities with self sustaining electrical power through such as a rechargeable nickel cadmium battery incorporated therein and if an external electrical power source is available, an electrical female AC jack, so that a digital device apparatus such as a digital video camera or other digital apparatus equipment can then be connected to a female T Ethernet (RJ-45), USB, cable F-connector high-speed data ports and female phone connector (RJ-11) to utilize the service and functionality offered by the MAC Cell Phone base station.

11. A MAC cell phone having a transceiver control and data stream transmission circuit comprising:
   a WLAN communications circuit in the apparatus;
   a VoIP communications circuit in the apparatus;
   a WiMAX communications circuit in the apparatus;
   a first (RJ-11) connector jack for connecting to a local telephone;
   a female T Ethernet (RJ-45), USB, cable F-connector high-speed data ports and female phone connector for use by any home or office equipment that require a closed hard connection to utilize the service and functionality offered by the device when digital communication is needed;
   a dial tone generator connected wirelessly to the (RJ-11) jack for providing a dial tone to the local telephone, facsimile machine;
   an off-hook detector connected wirelessly to the (RJ-11), female T Ethernet (RJ-45), USB, cable F-connector high-speed data ports jacks for detecting when the telephone, facsimile machine is off hook or an attempt for digital communication by any digital apparatus connected thereto is being made;
   a first line interrupter switch connected through a wireless transceiver to the jacks;
   a processor connected to the off-hook detector and first line interrupter switch for closing the first line interrupter switch when the off-hook detector detects an off-hook condition or attempt for digital communication is being received;
   a first buffer connected to the first line interrupter switch for storing DTMF tones or data for digital communication from the first line interrupter switch and the (RJ-11), female T Ethernet (RJ-45), USB, cable F-connector high-speed data port jacks;
   a DTMF, a digital data decoder connected to the first buffer and to the processor by the WLAN or WiMAX circuit communication for providing data signals to the processor which are related to the DTMF tones or high-speed digital data detected through the T Ethernet (RJ-45), USB, cable F-connector high-speed data ports;
   a DTMF as a digital data generator connected to the processor for generating digital data in response to data from the processor;
   a second buffer connected to the generator as a transceiver VoIP and or data stream circuit;
   a second line interrupter switch connected through the closed communication circuit to the second buffer and the first line interrupter switch connected to the processor for control of the second line interrupter switch;
   a Broad-Band; WLAN; WiMAX synthesizer and transceiver connection that is connected to the second line interrupter switch for connection through a wireless communications antenna through the device chosen path connection to an external ISP and or IDS; and a random access memory connected to the processor for storing and transferring high-speed data;

wherein said MAC cell phone is incorporated integrally by placement on or in a MAC Cell Phone base station having its own electrical power access to the home or office power grid, wherein the MAC cell phone base station charges the battery of the MAC cell phone by closed electric connection, has its own WLAN and WiMAX communication amplifier circuit to increase the WLAN and or WiMAX range of the MAC cell phone, and is equipped with a female T Ethernet (RJ-45), USB, cable F-connector high-speed data ports and female phone connector (RJ-11) for use by a home or office equipment that requires a closed hard connection;

and means for a MAC Cell Phone base station that is compact, portable, and have electrical power self sustaining abilities with self sustaining electrical power through such as a rechargeable nickel cadmium battery incorporated therein and if an external electrical power source is available, an electrical female AC jack, so that a digital device apparatus such as a digital video camera or other digital apparatus equipment can then be connected to a female T Ethernet (RJ-45), USB, cable F-connector high-speed data ports and female phone connector (RJ-11) to utilize the service and functionality offered by the MAC Cell Phone base station.

12. The MAC cell phone as in claim 11, further comprising a data transmission center—(DTC) connected through Broad-Band, WLAN, or WiMax modem communications, a third buffer connected to the second line interrupter switch, and a data receiver and sender connected to the third buffer and connected to the processor for transmitting to and receiving data from the data transmission center to the processor.

13. A MAC cell phone capable of connecting telephones, facsimile machines, computer systems, or a digital equipment to specific ISP and or IDS locations, comprising;

means for connecting a telephone, facsimile machine or digital apparatus that can make use of digital ISP and or IDS communications to the MAC Cell Phone Base Station female RJ-11, T Ethernet (RJ-45), USB, cable F-connector high-speed data port jacks;

means for generating a dial tone or digital communication and providing the dial tone or digital communication to the RJ-11 jack and or the T Ethernet (RJ-45), USB, cable F-connector high-speed data port jacks detecting an off-hook condition of the telephone, or attempt for digital communication from a facsimile machine, computer system, or digital apparatus that can make use of a modem connection to ISP and or IDS communications connected to the available RJ-11 jack, T Ethernet (RJ-45), USB, cable F-connector high-speed data port jacks;

means for switching DTMF signals from the telephone, or attempt for digital communication from facsimile machine or a modem device through a first buffer to a DTMF and digital communication decoder and providing data signals to or from a central processor;

means for controlling the closing of a second switch with the processor and Broad-Band modem connection to an external ISP and or IDS;

means for providing data signals to a DTMF generator and when required, data tones are generated by a data receiver decoder (DRD) modem and providing DTMF and data tone signals when required from the generator and DRD modem through a second buffer and means and method from the second buffer transmit by Broad-Band; WLAN; or WiMAX secure and user specific data communication via communication path selected to an ISP and or IDS transceiver;

and means for controlling the first switch from the processor and connecting the transceiver Broad-Band modem; WLAN; or WiMAX and communicating data of a standard or an encrypted non-standard protocol between the processor and a memory for connection of a called destination and or ISP and or IDS data communication, for data storage or retrieval;

wherein said MAC cell phone is incorporated integrally by placement on or in a MAC Cell Phone base station having its own electrical power access to the home or office power grid, wherein the MAC cell phone base station charges the battery of the MAC cell phone by closed electric connection, has its own WLAN and WiMAX communication amplifier circuit to increase the WLAN and or WiMAX range of the MAC cell phone, and is equipped with a female T Ethernet (RJ-45), USB, cable F-connector high-speed data ports and female phone connector (RJ-11) for use by any a home or office equipment that requires a closed hard connection;

and means for a MAC Cell Phone base station that is compact, portable, and have electrical power self sustaining abilities with self sustaining electrical power through such as a rechargeable nickel cadmium battery incorporated therein and if an external electrical power source is available, an electrical female AC jack, so that a digital device apparatus such as a digital video camera or other digital apparatus equipment can then be connected to a female T Ethernet (RJ-45), USB, cable F-connector high-speed data ports and female phone connector (RJ-11) to utilize the service and functionality offered by the MAC Cell Phone base station.

14. The MAC cell phone system according to claim 13, further comprising dialing a call or making ad data connection with a telephone, fax or modem connected to the corresponding data jack of the MAC Cell Phone Base Station for digital path connection to the MAC Cell Phone whereby decoding the dialed number in the DTMF decoder, noting the date and time of the dialed call with the processor and a clock and the memory attached to the processor, comparing an area code or exchange number of the dialed number and the date and time combination, and searching the memory for an appropriate selection of ISP and or IDS access, related to the device's choices of communication path completion, digital access code, and data with the digitally embedded dialed number or device data communication feature selected for unique user identifiable remote data retrieval and or storage.

15. The MAC cell phone system according to claim 13, further comprising a WLAN and WiMAX amplifier within the MAC Cell Phone Base Station that can facilitate digital communications through the MAC Cell Phone Base Station to and from the MAC Cell Phone and a digital apparatus equipped with WLAN or WiMAX or wireless communications capabilities.

16. The MAC cell phone system according to claim 1 further capable of high speed digital communication between the MAC Cell Phone and the MAC Cell Phone base station, that is a small and compact portable base station that allows for the connection of a digital apparatus by closed jack connection to the base station or in the alternative if said digital apparatus is WLAN or WiMAX or Wireless capable, secure access to the facilitation features of the MAC Cell Phone directly by wireless communication or if needed by closed high speed date port jack connection through the MAC Cell Phone base station.

17. The MAC cell phone system according to claim 1, in the event that the MAC Cell Phone cannot detect through the WLAN, WiMAX, WIRELESS, or BROADBAND TRANSCEIVER an adequate wireless communications access, the CPU will attempt a digital communication with a closed connection of an available broadband access through a digital line connected to one of the high speed communication jacks on the base station; wherein if detected by the CPU, the CPU will facilitate all services and features provided through the MAC Cell Phone system and base station of VoIP Call Routing, data transmission, data storage and retrieval, available through the MAC Cell Phone as a Multiple Communications Access device, utilizing the closed broadband connection detected by the MAC Cell Phone.

* * * * *